(No Model.)
J. McHARRIE.
HORSESHOE.
No. 500,150. Patented June 27, 1893.
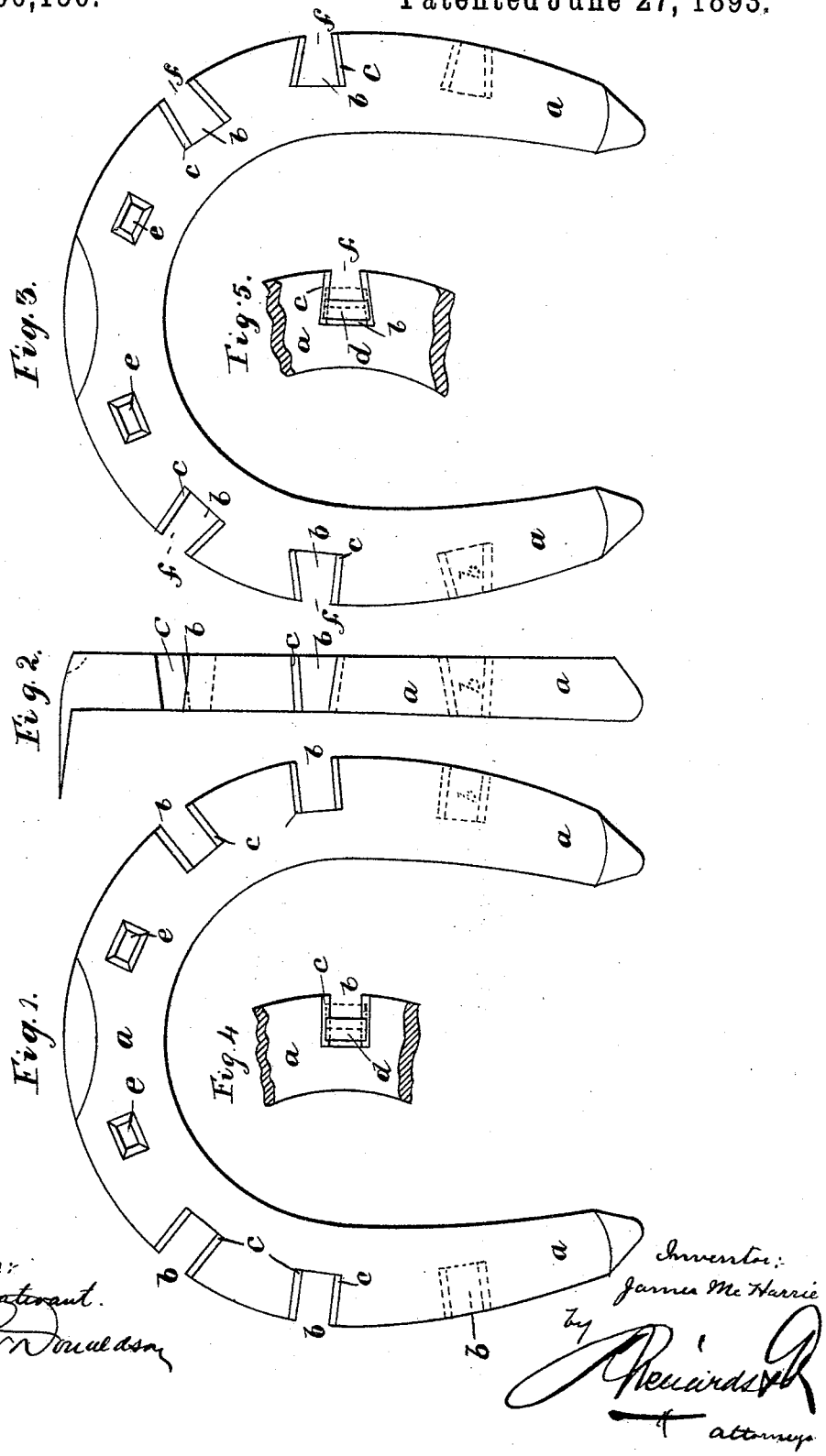

UNITED STATES PATENT OFFICE.

JAMES McHARRIE, OF STRANRAER, ASSIGNOR OF ONE-HALF TO ALEXANDER MURDOCH, OF BALLANTRAE, SCOTLAND.

HORSESHOE.

SPECIFICATION forming part of Letters Patent No. 500,150, dated June 27, 1893.

Application filed October 19, 1892. Serial No. 449,422. (No model.) Patented in England March 2, 1892, No. 4,100.

*To all whom it may concern:*

Be it known that I, JAMES McHARRIE, a subject of the Queen of Great Britain, and a resident of the town of Stranraer, Wigtownshire, Scotland, have invented a certain new and useful Improvement in Horseshoes, (for which I have obtained Letters Patent in Great Britain, dated March 2, 1892, No. 4,100,) of which the following is a specification.

This invention relates to horse shoes and it has for its object to so make the shoe that the hoof, when treading, can spread laterally.

In carrying out my invention, I make the shoe of the usual shape, but the nail holes are dove-tailed or tapered and open at the outside, that is to say they are cut away so as to allow the heads of the nails, when the hoof is expanded to move outward, *i. e.*, laterally in the holes. The tapered shape of the holes, prevents the shoe falling off. The nails at the toe of the shoe, may pass through holes in the usual manner.

A horse shoe made as hereinbefore described, allows the hoof to expand naturally and it also prevents, or aids in the prevention, of contraction and concussion. While giving the necessary protection to the foot, the improved shoe gives a much greater freedom of action than those generally in use.

In order that my said invention may be properly understood, I have hereunto appended an explanatory sheet of drawings, whereon—

Figure 1 is a plan view of the shoe. Fig. 2 is a side view. Fig. 3 is a plan view of a slightly altered shoe. Figs. 4 and 5 are enlarged detail views.

Referring to the drawings,—the shoe $a$, which may otherwise be of the ordinary shape and make, has nail holes $b$ which, as shown, are open at the side, that is, the holes appear as recesses or cuts made in the shoe. The holes $b$ are tapered or narrowed toward their under side so as to, when the shoe is fitted in place, grip the tapered heads of the nails and prevent the shoe falling off. The tapered sides of the holes $b$ are marked $c$ on the drawings. The position of the nail $d$, in the hole $b$, is shown clearly at Fig. 4. Four holes $b$ are shown, although there may be six or other number. The front or "toe" holes $e$ are preferably made of the usual form.

In Fig. 4 the dotted lines indicate the sideward travel of the nail $d$, in the hole $b$, due to the lateral expansion or spread of the hoof when the horse sets its foot down.

In Fig. 3 the holes $b$ are made dove-tail shape and are also tapered vertically at $c$. When the holes are made dove-tail-shape the nail $d$, in its lateral travel due to the spread of the hoof, is prevented from coming right out of the hole or recess $b$ as the opening $f$ is made sufficiently narrow to prevent the passage outward of the nail. Instead, however, of dove-tailing the holes $b$, two small projections or a bridge piece, or its equivalent, may be made or left across the opening $f$ for this purpose.

The improved shoe allows the hoof to have a natural and healthy action when the horse is running.

Having now fully described my invention, what I claim, and desire to secure by Letters Patent, is—

A horseshoe having the elongated openings for the nails extending to the edge thereof, said openings being narrowed toward the edge and having beveled edges, substantially as described.

In witness whereof I have hereunto set my hand, at Stranraer, Scotland, this 5th day of October, 1892.

JAMES McHARRIE.

In presence of—
 JAMES MOORE,
  *Accountant, Stranraer.*
 JARED KENNEDY TODD,
  *Stranraer.*